UNITED STATES PATENT OFFICE.

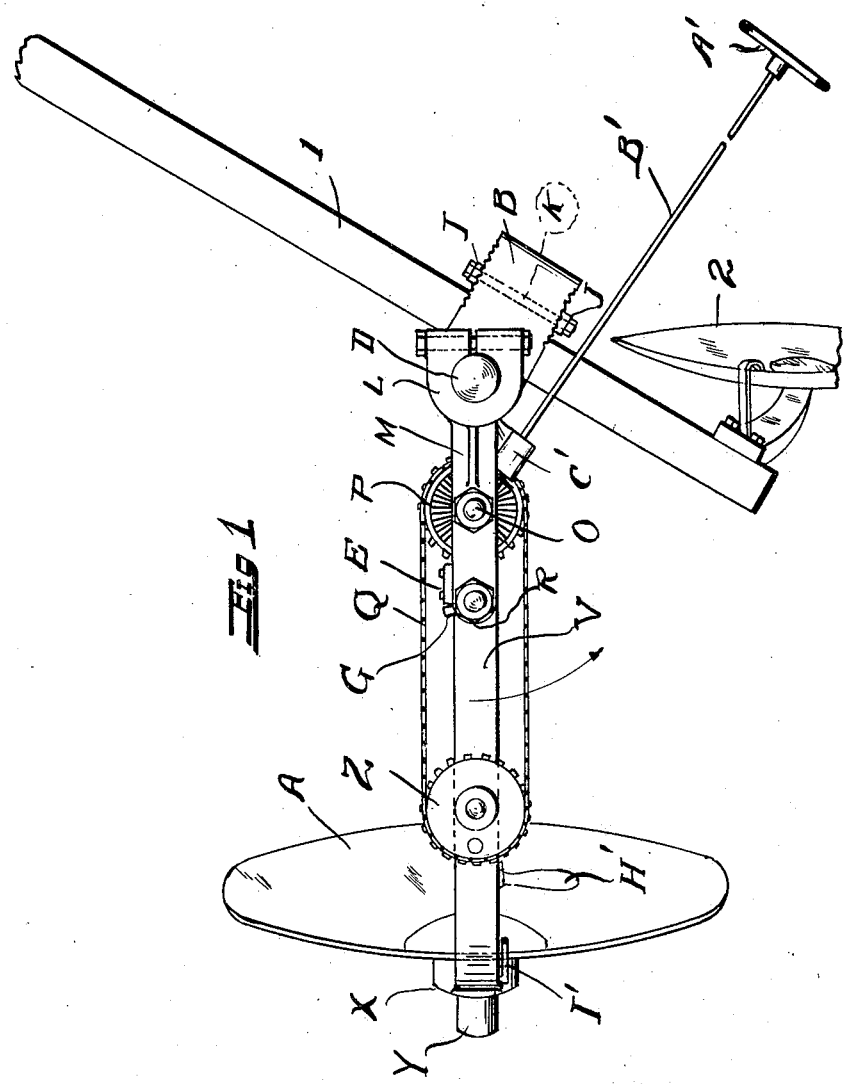

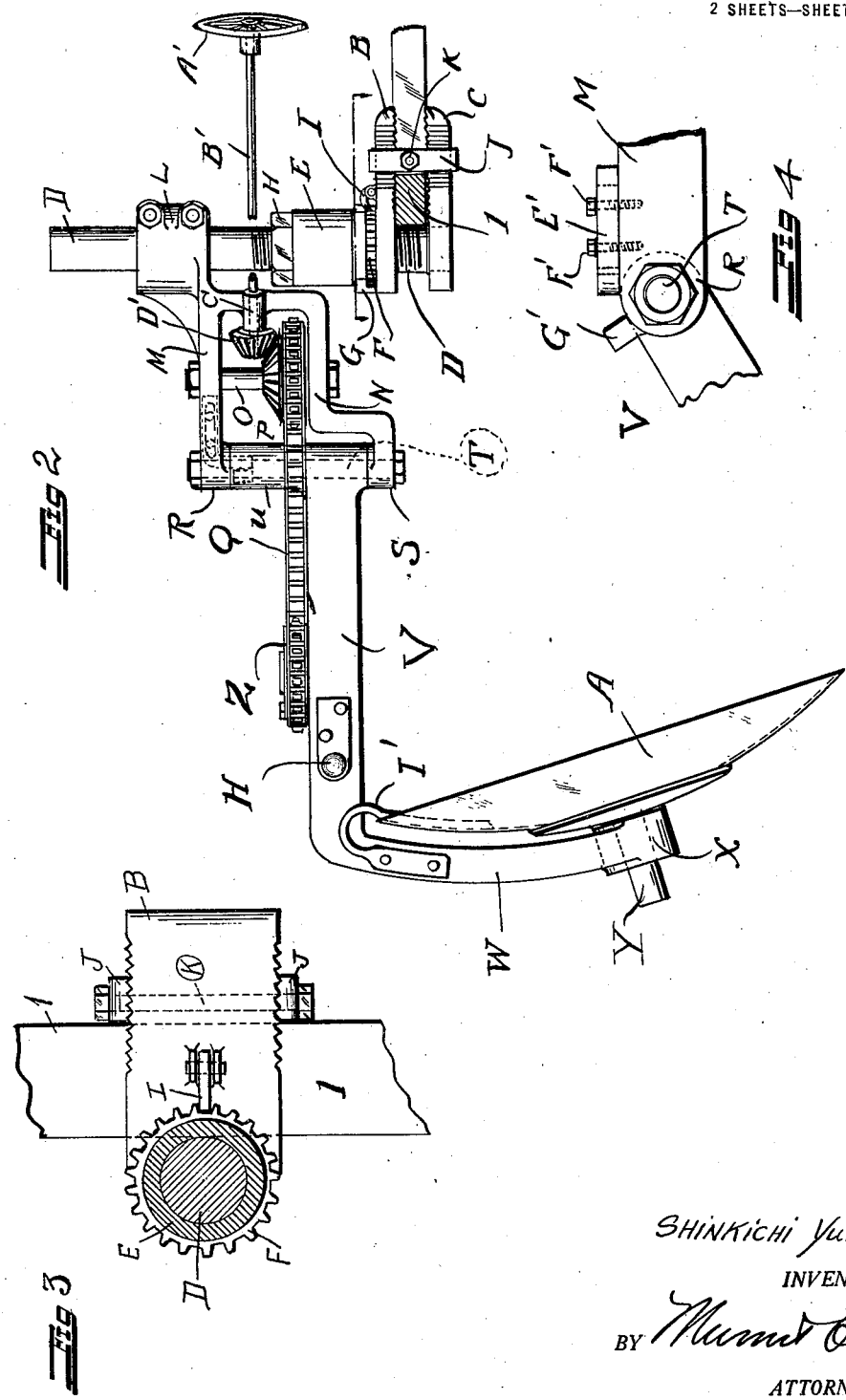

SHINKICHI YUASA, OF CUPERTINO, CALIFORNIA.

DISK PLOW AND THE LIKE.

1,370,079.  Specification of Letters Patent.  Patented Mar. 1, 1921.

Application filed May 6, 1920. Serial No. 379,349.

*To all whom it may concern:*

Be it known that I, SHINKICHI YUASA, a subject of the Emperor of Japan, residing at Cupertino, in the county of Santa Clara and State of California, have invented new and useful Improvements in Disk Plows and the like, of which the following is a specification.

My invention relates to agriculture implements and has reference more particularly to an improvement in disk plows and the like.

As heretofore practised, disk plows are usually arranged in gang formation on a suitable frame or carriage and towed behind a tractor or other towing machine. In using an implement of this kind, considerable inconvenience is experienced, and in some instances it is impossible to make a furrow close around trees and other obstructions, and also along fence lines and in fence corners, as the disks do not extend far enough out from the frame or carriage which carry them nor are they capable of sufficient horizontal angular adjustment.

According to the principal involved in the present case I propose to provide a so-called auxiliary disk which I prefer to mount upon the frame which carries the plow disks in such a manner that it may be manipulated to assume various horizontal angular positions relative to the frame and thus realize a practical advantage in turning a furrow close to fences, fence corners and other places not ordinarily effected by the conventional types of such implements.

In the accompanying drawings I have illustrated a construction which may be adopted in carrying out the invention. In said drawings Figure 1 is a plan view showing the application of the invention; Fig. 2 is a side elevation; Fig. 3 is a plan view of the clamping jaws for receiving the frame, and Fig. 4 is a plan view of the pivotal mounting for the arm which carries the auxiliary disk and showing the stop for limiting the movement of the disk in one direction.

Referring now to the drawings in detail:

As an example of the use of the invention, I will first refer to Fig. 1 which clearly shows the relative position of the device to the beam 1 of the frame which carries a plurality of disk plows 2, only one of which is shown. Considering the plow frame as adapted to be towed with the curvature of the disks 2 presented toward the axis of the line of draft the auxiliary disk A should normally be likewise presented so that it too may act to produce a furrow co-inciding to the furrows produced by the other disks. This so-called normal position of the auxiliary disk A should be accounted for when plowing in a more or less straight line and to realize this condition I propose to provide a pair of horizontal clamping jaws B and C the former having a fixed mounting on the end of the threaded standard D and the other having an opening adjacent its end made to receive the standard and on which it is carried with freedom of vertical movement so that the beam 1 may be engaged between their confronting serrated gripping ends. In clamping the beam between the jaws the standard D is equipped with a threaded collar E which carries a toothed disk F with a keeper G also connected to the collar and the top jaw B. As thus provided the jaw B is practically a part of the collar E and with it is adapted to assume various vertical positions on the standard. A nut lock also carried by the standard above the collar E may be used for locking the jaws in clamping position. Coöperating with this nut lock in maintaining the jaws locked, is a dogging device I which is carried on top of the jaw B and adapted to engage the teeth of the disk F. To still further hold the jaws clamped tightly on the beam and particularly to prevent the same from twisting out of clamping alinement the sides of the jaws are serrated with a pair of parallel strips J adapted to extend vertically of the jaws and also serrated on their inner sides to interlock with the serrations on the side of the jaws. These strips are joined in vertical gripping position relative to the jaws by a rod K which passes between the jaws longitudinally of and on the opposite side of the beam 1 from the standard D. The clamping effect of these strips may be regulated by the nuts which engage the threaded ends of the rod.

Carried by the standard D above the structure just defined and by means of the split sleeve L is a yoke like structure consisting of the horizontal members M and N. The members being spaced one above the other to form a supporting bearing for the vertical shaft O of the cone gear P, the circumference of which having sprocket teeth for accommodating the sprocket chain Q which passes around the gear, the purpose of which will be presently mentioned. The outer end of the member N is made in the shape of an L to increase the space between it and the member M so as to provide a pair of supporting bearings R and S for the shaft T of the sleeve U which is confined on the shaft with freedom of rotation. Constructed as a part of this sleeve U is the horizontal arm V which terminates in a slightly curved downwardly presented suspension W for the disk A which is carried with freedom of rotation, thereby by the bearing X made to receive the axle Y of the disk.

Arranged on the top side of the arm V and in substantially the same plane as the gear P is a sprocket gear around which the sprocket Q passes.

Positioned at any convenient place for manual manipulation is a hand wheel $A^1$ having a rod $B^1$ to which it is fixed with the rod supported in a bearing $C^1$ adjacent the gear P. A pinion $D^1$ mounted on the end of the rod is adapted to mesh with the gear P so that by turning the hand wheel $A^1$ in either a clockwise or anticlockwise direction the arm V together with the disk A may be moved in a horizontal plane with the motion imparted through the sprocket Q. With this construction it will be readily seen how the position of the disk A relative to the plow frame which carries it may be moved to assume various horizontal angular adjustments for instance it may be moved toward or away from the plow frame as occasion demands for producing a furrow in places not accessible to the disk carried by the frame.

As it will be impractical to move the disk A beyond a certain degree forward, a suitable stop is provided for this purpose. This stop may comprise a block $E^1$ fixed on the side of the arm B by suitable bolts $F^1$ with a finger or lug $G^1$ carried by the sleeve U and made to abut against the block for limiting the movement of the arm V. In some instances it may be necessary to permit the disk to swing forward a given degree therefore the stop is made adjustable by slotting the block $E^1$ so that the contact of the lug $G^1$ may be advanced or retarded by adjusting the position of the block longitudinally on the arm which carries it. $H^1$ represents a suitable handle for lifting the disk A and its carrier members and $I^1$ represents a scraper for the disk.

It should also be noted that the split sleeve L may be adjusted on the standard D for realizing a change of the position of the disk relative to the plow frame. The same features are also to be had by determining the position of the engagement of the jaws D and C on the beam 1.

I claim:

A disk plow having detachable means for engaging a suitable towing medium, said detachable means comprising a pair of clamping jaws, a standard on which said jaws are mounted, means on the standard for effecting a clamping action of the jaws, a pair of spaced horizontally disposed members having a split clamping sleeve engaging said standard and capable of a vertical or lateral adjustment relative thereon, said horizontally spaced members providing supporting bearings for a shaft, a sleeve mounted on said shaft with freedom of movement thereon, an arm connected to said sleeve having a downwardly presented end to which the plow disk is mounted, an axle also supported by said horizontally spaced members, a sprocket gear on said shaft, a second sprocket gear on said arm, a sprocket connecting said gears, and means for rotating the first named gear and imparting a swinging movement to said plow disk through said sprocket.

SHINKICHI YUASA.